(12) United States Patent
Naderi

(10) Patent No.: US 9,262,393 B2
(45) Date of Patent: Feb. 16, 2016

(54) METHOD AND SYSTEM FOR PROVIDING SIMPLIFIED FORM FILLING IN AN ON-DEMAND SERVICE

(75) Inventor: Nadia Naderi, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 9 days.

(21) Appl. No.: 13/030,096

(22) Filed: Feb. 17, 2011

(65) Prior Publication Data

US 2012/0054593 A1    Mar. 1, 2012

Related U.S. Application Data

(60) Provisional application No. 61/402,576, filed on Aug. 31, 2010.

(51) Int. Cl.
*G06F 17/24* (2006.01)

(52) U.S. Cl.
CPC ................ *G06F 17/243* (2013.01)

(58) Field of Classification Search
CPC .. G06F 17/243; G06F 17/2247; G06F 17/248
USPC .............. 715/221–226, 705, 708, 744, 745
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |

(Continued)

OTHER PUBLICATIONS

HotDocs, Sample Page from the URL "http://www.hotdocs.com/?clid=CMbb2pmpjb0CFRRsfgodGHUAcg," accessed Mar. 12, 2014.

*Primary Examiner* — Wilson Tsui
(74) *Attorney, Agent, or Firm* — Ingrassia Fisher & Lorenz, P.C.

(57) ABSTRACT

In accordance with embodiments, there are provided mechanisms and methods for providing simplified form filling in an on-demand service in a database system. These mechanisms and methods can enable embodiments to provide users with an efficient form wizard for filling electronic forms. The ability of embodiments to provide a form wizard can enable users to efficiently accomplish the rapid filling of multiple forms without the need to scroll through the electronic forms and entering the same information repeatedly.

26 Claims, 18 Drawing Sheets

(56) References Cited

U.S. PATENT DOCUMENTS

| | | |
|---|---|---|
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,697,383 B1 * | 2/2004 | Li et al. ............ 370/510 |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,910,179 B1 * | 6/2005 | Pennell et al. ............ 715/207 |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,958,449 B2 * | 6/2011 | Chen ............ 715/709 |
| 7,966,561 B1 * | 6/2011 | Nguyen et al. ............ 715/277 |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,476 B2 * | 1/2012 | Bierner et al. ............ 705/500 |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,355,966 B1 * | 1/2013 | Vu et al. ............ 705/30 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0103827 A1 * | 8/2002 | Sesek ............ 707/505 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268225 A1 * | 12/2004 | Walsh et al. ............ 715/501.1 |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0059434 A1 * | 3/2006 | Boss et al. ............ 715/780 |
| 2006/0179404 A1 * | 8/2006 | Yolleck et al. ............ 715/507 |
| 2007/0011304 A1 * | 1/2007 | Error ............ 709/224 |
| 2008/0120257 A1 * | 5/2008 | Goyal et al. ............ 706/12 |
| 2008/0249972 A1 | 10/2008 | Dillon |
| 2009/0063414 A1 | 3/2009 | White et al. |
| 2009/0100326 A1 * | 4/2009 | McCormick ............ 715/226 |
| 2009/0100342 A1 | 4/2009 | Jakobson |
| 2009/0177744 A1 | 7/2009 | Marlow et al. |
| 2010/0077058 A1 * | 3/2010 | Messer ............ 709/219 |
| 2010/0313111 A1 * | 12/2010 | Ozonat et al. ............ 715/222 |
| 2011/0247051 A1 | 10/2011 | Bulumulla et al. |
| 2012/0042218 A1 | 2/2012 | Cinarkaya et al. |
| 2012/0218958 A1 | 8/2012 | Warshavsky et al. |
| 2012/0233137 A1 | 9/2012 | Jakobson et al. |
| 2013/0198628 A1 * | 8/2013 | Ethier et al. ............ 715/709 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

* cited by examiner

FIG. 6

502 — Business Account Edit
New Account                                          600                        Help for this Page ⓘ

Business Account Edit    504 — Save  506 — Save & New  508 — Cancel         602 — Form Wizard
                                                                            I = Required Information
Account Information Account Owner
Account Name                    — 510                    Phone
Account Name (Local)            — 512                    Fax
Parent Account                                           Website
Account Plan                                             Account Currency    USD – U.S. Dollar
Corporate HQ      --None--                               Annual Revenue
Ownership                                                Employees
Ticker Symbol                                            Employees at Location
Marketing Engagement  User                               Population
Organization ID (DW)                                     Account Record Type  Sales
                                                         AMER Locked Sector Address Information                                      Copy Billing Address to Shipping Address Shipping Street         — 512                            Billing Street        — 512
Shipping City                                            Billing City
Shipping State/Province                                  Billing State/Province
Shipping Zip/Postal Code                                 Billing Zip/Postal Code
Shipping Country                                         Billing Country Salesforce Team Search
Search All          Go!
☐ Limit to items I own
Advanced Search...

Google Talk
[Hide | Pop Out]
You are not currently
logged in to Google Talk.
Sign in Contacts | ○Roberto | OK
○ Ana
  Available ▼
Search, add, or invite
○ Davi
  Available
○ Karine
  Available
○ Roberto
  Muddy feet!
○ corgicrazy
  Available
○ Ivete Create New...

FIG. 10

Business Account Edit
New Account

Help for this Page ⓘ

602 — Form Wizard
I = Required Information

Business Account Edit 600

504 506 508
Save | Save & New | Cancel

Account Information

- Account Owner
- Account Name — 512 — 510
- Account Name (Local)
- Parent Account — New Account – Form Wizard
- Account Plan ⓘ — 608 — Click 'Enter' for the Next Field — Phone — 512
- Corporate HQ — Fax
- Ownership — --None-- — 610 — Currency — 1004 — Setup — 512
- Ticker Symbol — 604 — 612 — USD – U.S. Dollar — 1002
- Marketing Engagement — User — 614 — Use Arrow keys to select... — Default — 510
- Organization ID (DW) — 512 — 618 — 620 — 622 — 512
  - Done | Cancel | Clear All
- Sales

Address Information

Copy Billing Address to Shipping Address

- Shipping Street — 512 — Billing Street — 512
- Shipping City — Billing City
- Shipping State/Province — Billing State/Province
- Shipping Zip/Postal Code — Billing Zip/Postal Code
- Shipping Country — Billing Country

Salesforce Team

502

Search
Search All
Go!
☐ Limit to items I own
Advanced Search...

Google Talk
[Hide | Pop Out]
You are not currently logged in to Google Talk.
Sign in
Contacts | Roberto | OK
Search, add, or invite
○ Ana Available ▼
○ Davi Available
○ Karine Available
○ Roberto Muddy feet!
○ corgicrazy Available
○ Ivete Create New... ▼

FIG. 13

502 — Business Account Edit / New Account

600 — Business Account Edit

602 — Help for this Page / Form Wizard / ! = Required Information

Account Information
- Account Owner
- Account Name !
- Account Name (Local)
- Parent Account
- Account Plan
- Corporate HQ
- Ownership —None
- Ticker Symbol
- Marketing Engagement
- Organization ID (DW) User 1200 — New Account - Form Wizard Setup 1201 — Select fields to be added to your form wizard 1202 — (fields list):
- Account Name (Local)
- Parent Account
- Account Plan
- Corporate HQ
- Ownership
- Ticker Symbol
- Marketing Engagement
- Organization ID (DW)
- Shipping Street
- Shipping City
- Shipping State/Province

- Phone
- Fax
- Website
- Annual Revenue
- Employees at Location
- Population
- Account Record Type
- AMER Locked Sector
- Billing Street
- Billing City
- Billing State/Province 1204 OK   1206 Cancel   1208 Uncheck All Address Information
- Shipping Street
- Shipping City
- Shipping State/Province
- Shipping Zip/Postal Code
- Shipping Country g Address to Shipping Address Salesforce Team

METHOD AND SYSTEM FOR PROVIDING SIMPLIFIED FORM FILLING IN AN ON-DEMAND SERVICE

CLAIM OF PRIORITY

This application claims the benefit of U.S. Provisional Patent Application 61/402,576 entitled "METHOD AND SYSTEM FOR PROVIDING SIMPLIFIED FORM FILLING IN AN ON-DEMAND SERVICE," by Nadia Naderi, filed Aug. 31, 2010, the entire contents of which are incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to form filling in an on-demand electronic services environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional sales application database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. A user might enter data to be stored on the database system using the user's own systems. The efficient submittal, rapid retrieval, and subsequent delivery of this information to the user system have been and continue to be a goal of administrators of database systems.

Unfortunately, electronic form filling in conventional database systems can be time consuming and error prone. Electronic forms often contain mandatory fields requiring a user to input data on each occasion the electronic form is filled. Having to repeatedly fill in electronic forms manually with the same information is inefficient and prone to error.

Accordingly, it is desirable to provide techniques for enabling simplified form filling in an on-demand service in a database system in a manner that improves user efficiency and reduces errors.

BRIEF SUMMARY

In accordance with embodiments, there are provided mechanisms and methods for simplified form filling in an on-demand service in a database system. These mechanisms and methods can enable embodiments to provide users with an efficient form wizard for filling electronic forms. The ability of embodiments to provide a form wizard can enable users to efficiently accomplish the rapid filling of multiple forms without the need to scroll through the electronic forms and entering the same information repeatedly.

In an embodiment and by way of example, a method for providing simplified form filling in an on-demand service is provided. The method includes providing a form wizard to a user and allowing the user to set the properties of the form wizard. Once the form wizard properties are set by the user, the user may fill multiple electronic forms by using the form wizard dialog box to fill in form fields without having to scroll through the electronic form and re-enter previously supplied information.

While the present invention is described with reference to an embodiment in which methods for providing simplified form filling in an on-demand service are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2®, by IBM, and the like, or no database at all, without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 6 is a screen capture showing an example of an electronic form with a form wizard button;

FIG. 10 is a screen capture showing an example of the correspondence between an empty drop down form field and a form wizard drop down field;

FIG. 13 is a screen capture showing an example of the correspondence between an electronic form and the various optional fields that may be enabled with the form wizard setup dialog;

DETAILED DESCRIPTION

General Overview

Figure 1:
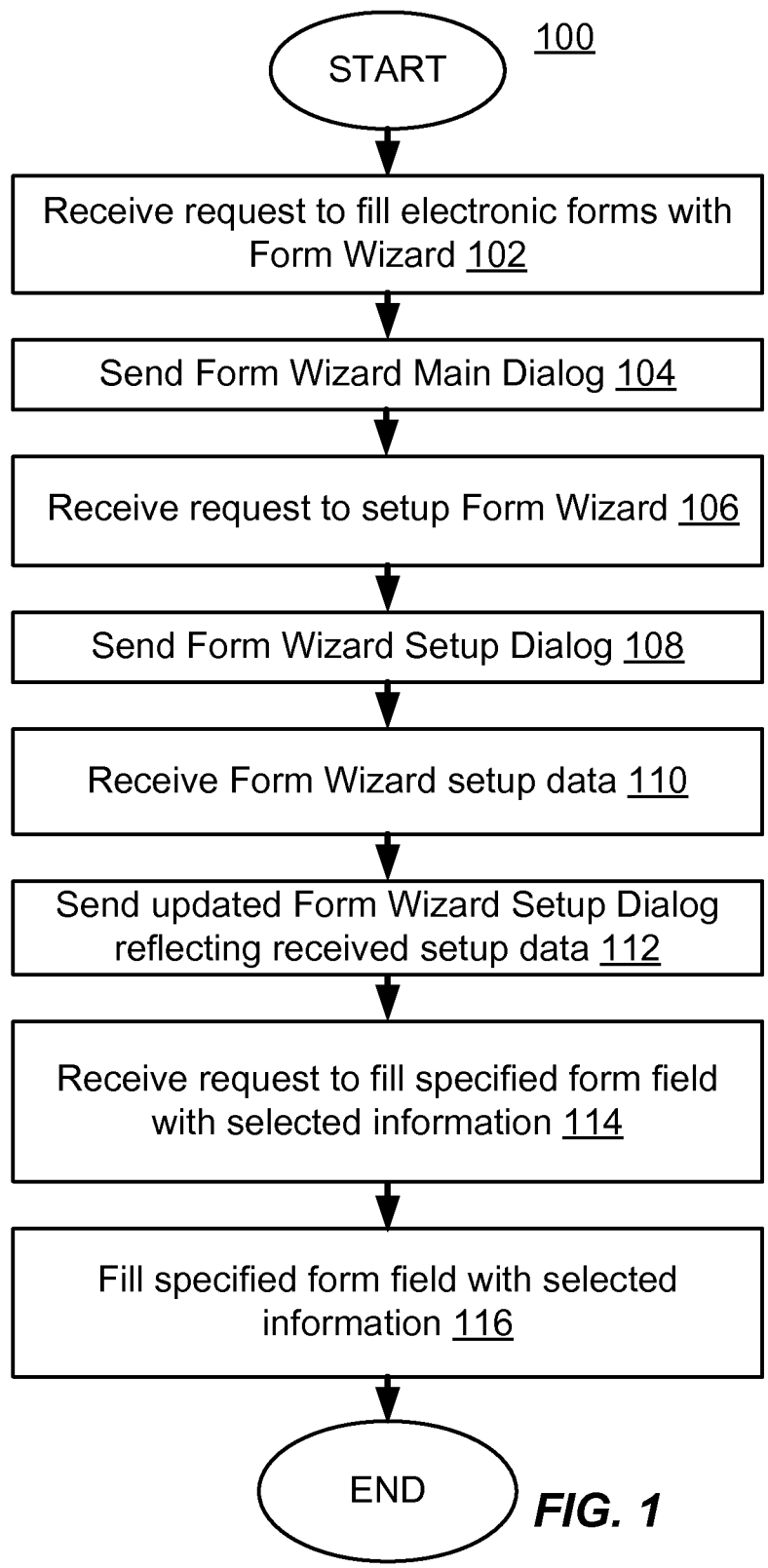
FIG. 1 shows an embodiment of a system-side method for providing simplified form filling including setup in an on-demand service.

Systems and methods are provided for providing simplified form filling in an on-demand service.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Simplified Form Filling

Filling electronic forms in web pages or software applications has often required a significant amount of hand movement, screen scrolling, and pointing device selections, particularly for the average user who is unfamiliar with shortcut key functions. Even experienced users may need to use a pointing device, such as a mouse, to select mandatory form fields which may be scattered around an electronic form. For example, an electronic form may have a number of mandatory form fields, some of which are visibly displayed on a user system display, and some of which require the user to scroll down the user system display in order to be viewed and filled in. A mandatory form field may be any form field designated by the creator or administrator of the electronic form requiring the user to input data into the mandatory form field before the user can submit the electronic form.

The use of a form wizard may provide a simplified and ergonomic way of filling electronic forms. A form wizard may help prevent repetitive motion syndrome and eye strain, save the user time, and enable an administrator to design standardized form requirements. A form wizard may allow a user to efficiently fill form fields without needing to scroll and navigate through an entire electronic form.

The form wizard may be provided as part of an on-demand service. The on-demand service may be provided as a multi-tenant service, which may include a multi-tenant database system. In an embodiment, as a result of the on-demand service, a user may fill multiple electronic forms, often times filling the electronic forms with identical information.

In an embodiment, a form wizard may consist of one or more dialogs that enable a user to fill an electronic form with minimal use of a pointing device. An embodiment may use a dialog for filling electronic form fields. In general, a dialog is a box or window that acts as an interface between a user and a computer system, a software application on the computer system, and/or a feature of a software application on the computer system. A form wizard dialog may be a window sent to the user system that allows the user to interact with the computer system and submit information used for filling an electronic form, among other things. For example, the form wizard dialog may have features for allowing a user to set up, select, and/or designate as default, information to be used for filling an electronic form. Additionally, the form wizard dialog may have tutorials and instructions that describe the use of the form wizard.

A dialog of the form wizard may automatically determine which form fields are mandatory. For example, mandatory form fields are often marked with an asterisk, colored sidebar, or colored underlining. In an embodiment, a second dialog may be a set up dialog for setting the properties of the form wizard. The setup dialog may enable an administrator or user having the appropriate privileges to include form fields that are optional, but additionally desired, to be handled by the form wizard.

After setting up the form wizard, a user may use the form wizard to fill form fields wherever they appear in an electronic form. In an embodiment, after completing the setup process of the form wizard, the user may utilize an input device, such as a keyboard, to fill the form fields by clicking on the 'Enter' key. The 'Enter' key may automatically update the data in the appropriate form field and display the next mandatory form field in the form wizard. In an alternative embodiment, the user may utilize any key designated by the administrator, or by the user, to automatically update the data in the appropriate form field. In an embodiment, the form wizard may enable the user to add default values to the fields for repeated use. For example, a user may set U.S. dollars as the default currency type to be used in an electronic form field. Each time an electronic form having a form field requiring a currency type is encountered, the default type U.S. dollars may be displayed first, allowing the user to dispense with selecting the currency type, unless another currency type is desired.

The form wizard may be implemented on a front end using webpages, HTML, Cascading Style Sheets (CSS), and/or Javascript. In an embodiment, the content of the form wizard and the setup dialog box may be populated based on a secured database and the values of each electronic form. For example, the secured database may contain information regarding each of the electronic form types that may be submitted to the secure database. The information about the electronic forms may include the form field type, such as mandatory or optional, and the number of form fields for each electronic form. The form wizard design may be applied to any virtual application, desktop application, or webpage forms, to simplify the process of filling forms.

FIG. 1 shows an embodiment of a system-side method 100 for providing simplified form filling including setup in an on-demand service, which may include the steps of receive request 102, send form wizard dialog 104, receive request to set up 106, send setup dialog 108, receive setup data 110, send updated dialog 112, receive request to fill 114, and fill form 116. In other embodiments, system-side method 100 may not have all of the steps listed and/or may have other steps instead of, or in addition to, those listed above.

A system-side method 100 may begin with receive request step 102 from a user system to provide simplified form filling. In response to the request from a user system, in step 104, the system for providing simplified form filling may send a form wizard dialog to the requesting user system. In step 106, the system for providing simplified form filling in an on-demand service may receive a request to set up the form wizard from the user system. In response to the user request, in step 108, the system for providing simplified form filling in an on-demand service may send a setup dialog.

In step 110, the system for providing simplified form filling may receive setup data for configuring the form wizard. For example, a user may use the setup dialog to select and send additional form fields the user may wish to be filled by the form wizard. Upon receiving the additional setup data, in step 112, the system may send an updated form wizard to the user reflecting the additional form fields selected by the user. In step 114, a request to fill an electronic form field with the newly setup form wizard may be received. In step 116, in response to the request, the system for providing simplified form filling may fill the specified form field with the information designated by the user.

Figure 2:
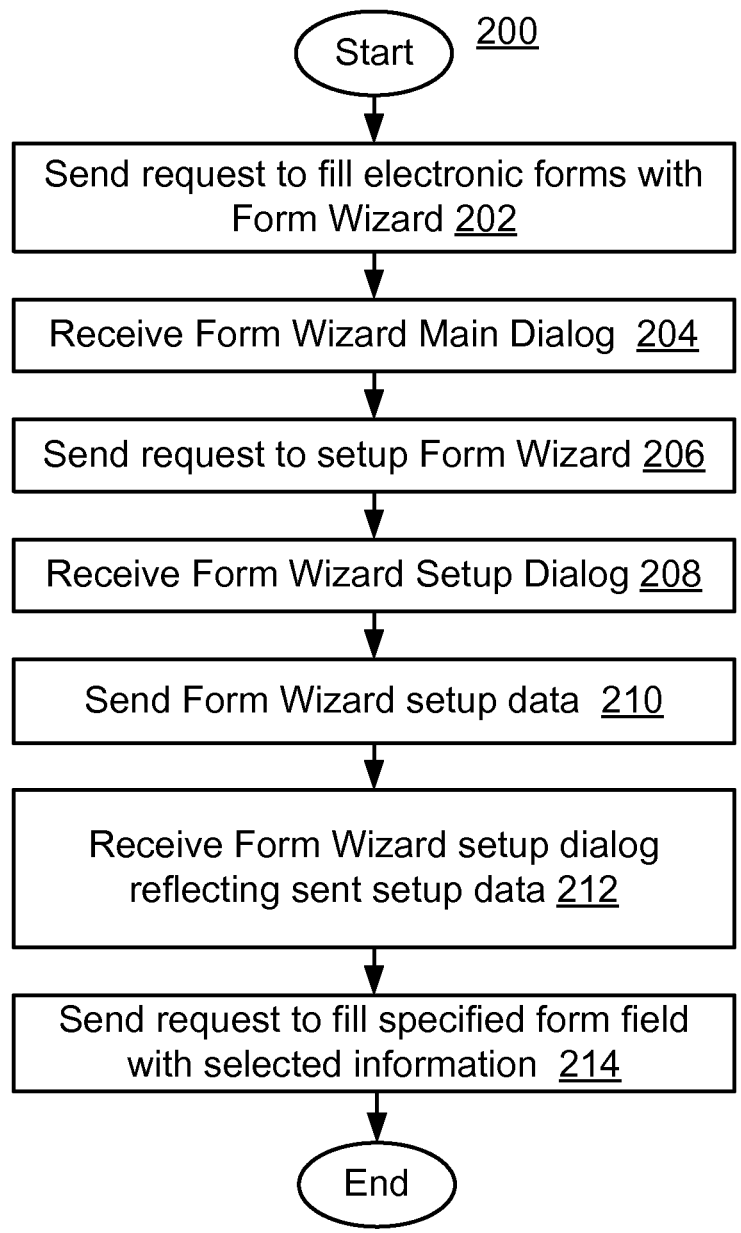
FIG. 2 shows an embodiment of a user-side method for providing simplified form filling including setup in an on-demand service.

FIG. 2 shows an embodiment of a user side method 200 for providing simplified form filling including setup in an on-demand service which may include the steps of send request 202, receive form wizard dialog 204, send request setup 206, receive setup dialog 208, send wizard setup data 210, receive updated form wizard dialog 212, and send request to fill 214. In other embodiments, a user side method 200 for providing simplified form filling may not have all of the steps listed and/or may have other steps instead of, or in addition to, those listed above.

A user side method 200 for providing simplified form filling may begin with the step 202 of a user sending a request to use a form wizard for simplified electronic form filling in an on-demand service. For example, an electronic web form of an on-demand service may have a form wizard button which when selected sends a request to use the form wizard for filling the electronic form. Once the request to use the form wizard for simplified form filling is sent, in step 204, a user may receive a form wizard dialog. In step 206, the user may send a request to set up the form wizard. For example, the form wizard main dialog may include a button which when selected, sends a request for a setup dialog.

In step 208 the user may receive a form wizard setup dialog allowing the user to select optional fields that may be filled by the form wizard. In step 210, the user may select the optional fields to be handled by the form wizard and send the form wizard setup data to the system providing simplified form filling. In step 212, the user receives the form wizard main dialog reflecting the optional fields selected via the setup dialog. In step 214, the user sends a request to fill specified form fields using the updated form wizard.

Figure 3:
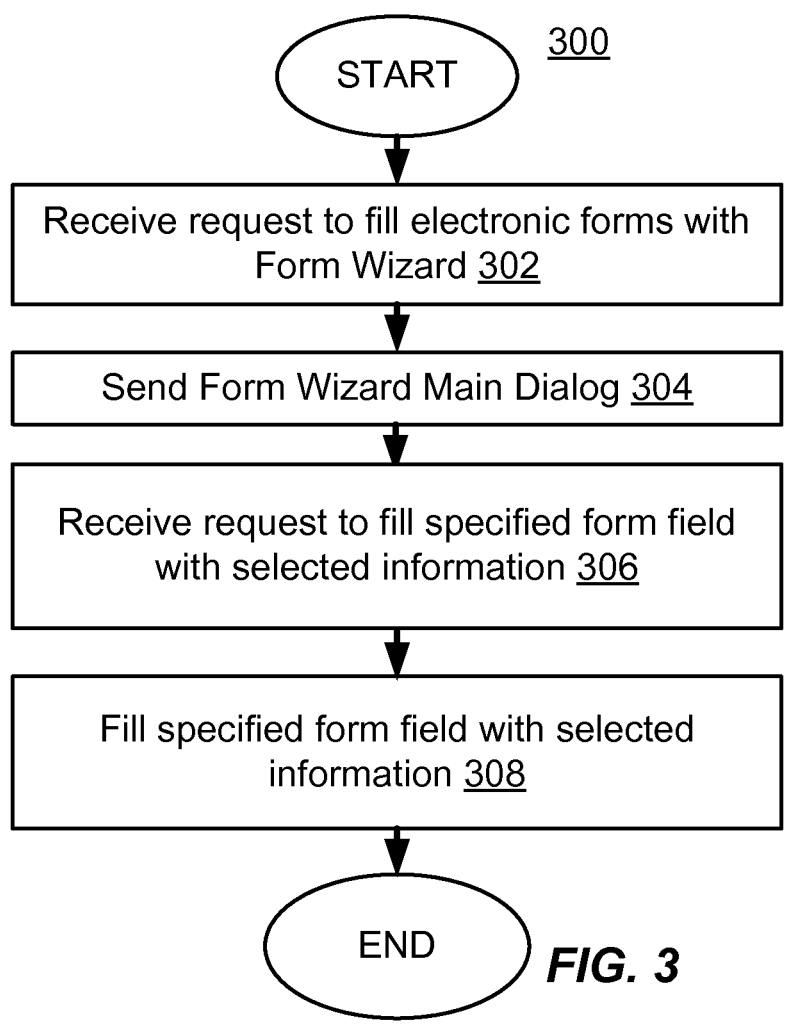
FIG. 3 shows an embodiment of a system-side method for providing simplified form filling in an on-demand service.

FIG. 3 shows an embodiment of a system-side method 300 for providing simplified form filling in an on-demand service which may include the steps of receive request 302, send form wizard dialog 304, receive fill request 306, and fill form 308. In other embodiments, system-side method 300 may not have all of the components listed and/or may have other elements instead of, or in addition to, those listed above.

A system-side method 300 may contain steps similar or identical to system-side method 100. For example, the steps of receive request 302, send form wizard dialog 304, receive fill request 306, and fill form 308 may be similar or identical to the steps of receive request 102, send main dialog 104, receive fill request 110, and fill form 112. System side method 300 differs from system side method 100 by omitting method steps related to setup of the form wizard. System side method 300 may be used after setup has been completed or may be used if the mandatory form fields are the only fields of interest to the user, i.e. no optional fields are to be filled.

Figure 4:
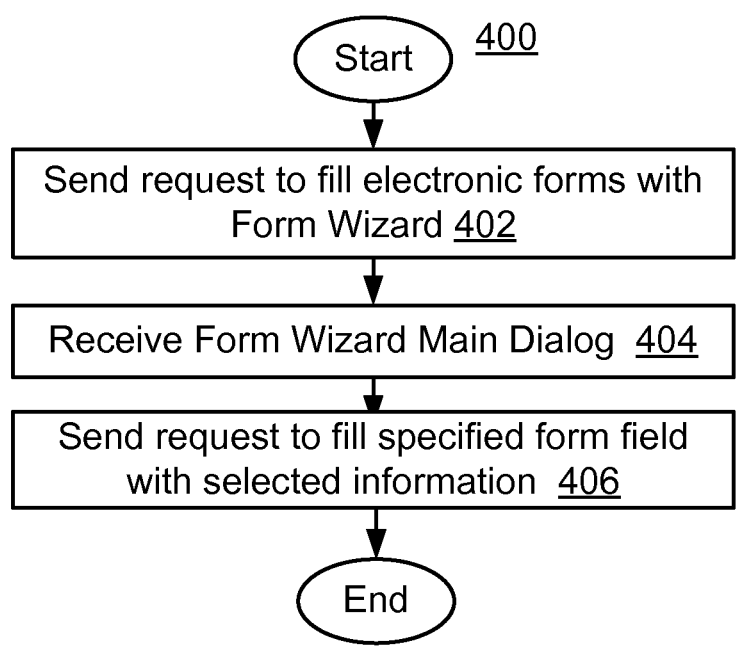
FIG. 4 shows an embodiment of a user-side method for providing simplified form filing in an on-demand service.

FIG. 4 shows an embodiment of a user-side method 400 for providing simplified form filing in an on-demand service, which may include the steps of send request 402, receive form wizard dialog 404, and send fill request 406. In other embodiments, user-side method 400 may not have all of the components listed and/or may have other elements instead of, or in addition to, those listed above.

A user-side method 400 for providing simplified form filling may contain steps similar or identical to user-side method 200 for providing simplified form filling. For example, the steps of send request 402, receive form wizard dialog 404, and send fill request 406 of user-side method 400 may be similar or identical to the steps of send request 202, receive main dialog 204, and send fill request 206 of user-side method 200. User side method 400 differs from user side method 200 by omitting method steps related to setup of the form wizard. System side method 400 may be used after setup has been completed or may be used if the mandatory form fields are the only form fields of interest to the user, i.e. no optional fields are to be filled.

Figure 5:
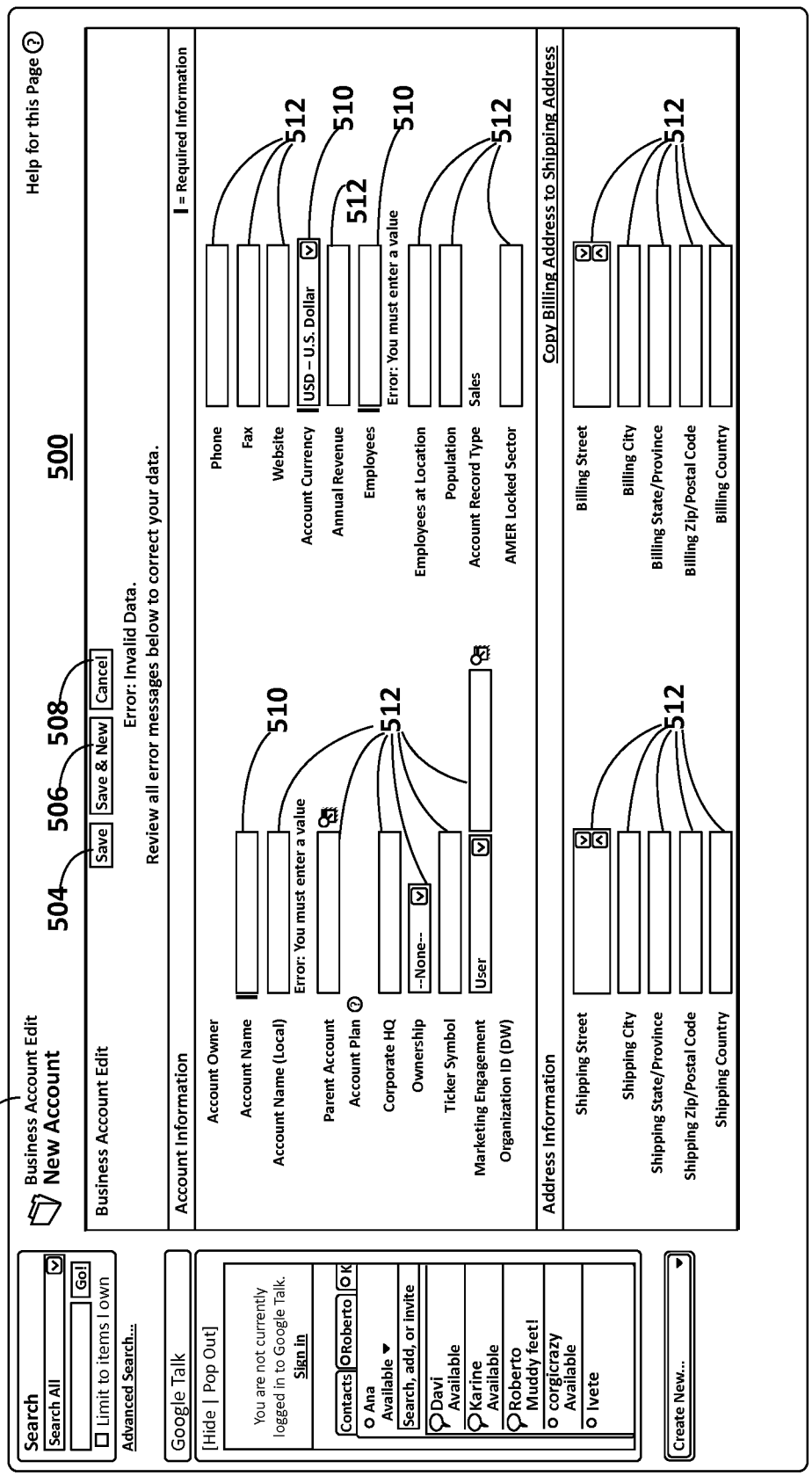
FIG. 5 is a screen capture showing an example of an electronic form having empty form fields for manual filling.

FIG. 5 is a screen capture showing an example of an electronic form 500 having empty form fields for manual filling. The electronic form 500 may contain electronic form type 502, save button 504, save and new button 506, cancel button 508, mandatory form fields 510, and optional form fields 512. In other embodiments, electronic form 500 may not have all of the components listed and/or may have other elements instead of, or in addition to, those listed above.

The electronic form 500 may be any form allowing a user to manually submit data to a system. For example, the electronic form 500 may be a webpage having form fields for submitting customer purchase information, an application software form for creating a user profile, or other any other form type for submitting a set of data. The electronic form 500 may require a user to manually enter data for each form field and manually scroll through and navigate the screen to access additional form fields not currently displayed. The electronic form 500 may be used for submitting new business account information. The electronic form type 502 may be indicated on the form itself. For example, the electronic form 500 has a form type 502 indicated as a form for submitting data related to a new business account. Save button 504 may be used to submit and save data manually entered by the user into the electronic form 500. Save and new button 506 may be used to submit and save the data manually entered by the user and to request a new form for the user to enter additional data into. For example, a user may be submitting data for more than one new business account. The user may use save and new button 506 to submit the first new business account once the form fields are completed, then receive a second form to be used for entering data for the second new business account. The cancel button 508 may be used to quit filling a form and discard the contents that have been filled by the user.

FIG. 6 is a screen capture showing an example of an electronic form 600 with a form wizard button 602. The electronic form 600 may be similar or identical to the electronic form 500 of FIG. 5 except the electronic form 600 preferably contains a form wizard button 602, which may be included on any electronic form requiring data entry. Selecting the form wizard button 602 may launch a form wizard dialog that allows a user to interact with the form wizard and select input data for filling empty form fields in electronic form 600.

Figure 7:
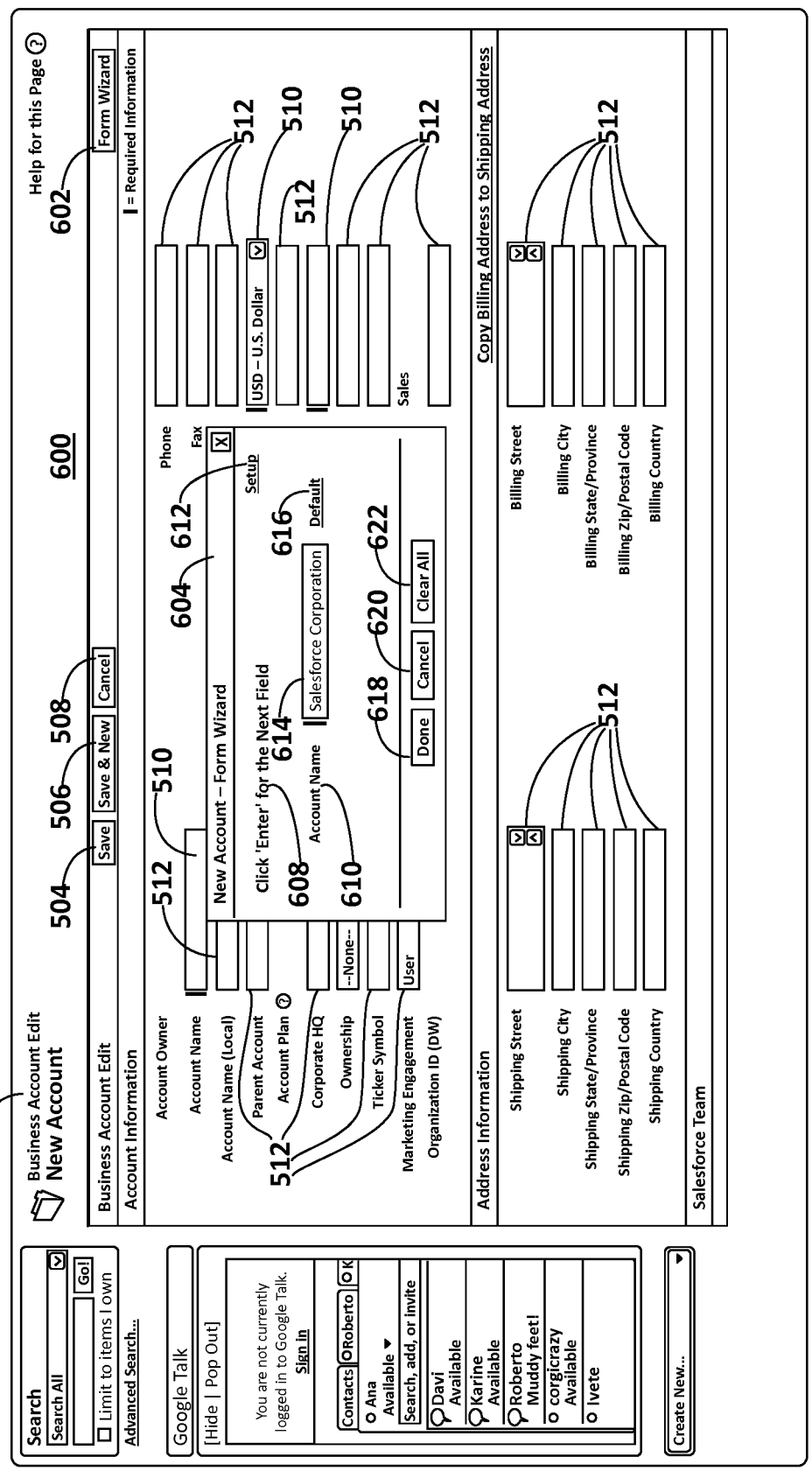
FIG. 7 is a screen capture showing an example of an electronic form with an open form wizard dialog.

FIG. 7 is a screen capture showing an example of an electronic form 600 with an open form wizard dialog 604. The electronic form 600 of FIG. 7 may be similar or identical to the electronic form 600 of FIG. 6. The form wizard dialog 604 may contain form name 606, instruction 608, form field name 610, setup button 612, default data 614, default button 616, done button 618, cancel button 620, and clear all button 622. In other embodiments, form wizard dialog 604 may not have all of the components listed and/or may have other elements instead of, or in addition to, those listed above.

The form wizard dialog 604 may be used to fill form fields. In an embodiment, in addition to displaying the mandatory form fields one at a time, the form wizard dialog may display optional fields selected in a setup dialog. The small size of the form wizard dialog minimizes or eliminates scrolling and mouse use and limits the hand movement to typing in a single box.

The form name 606 displayed in the form wizard indicates the type of form the user is attempting to fill with the form wizard. The instruction 608 may briefly instruct the user about using the form wizard dialog 604 to fill form fields. The form field name 610 informs the user of the corresponding empty form field of electronic form 600 that will be filled by the form wizard. The setup button 612 when selected allows the user to set up the form wizard to handle filling optional form fields. Selection of the setup button 612 will open a setup dialog of the form wizard, allowing the user to choose which optional fields will be handled by the form wizard. Default data 614 may display the information that will be entered by the form wizard into the empty form field of the electronic form 600 that corresponds to the indicated form field name 610. Default button 616 may be used to set a new default value for the displayed form field name 610. In an embodiment, the default button 616 may be a hyperlink that sets the current value as the default value, so each time the user opens the same electronic form, the form field contains the prefilled value. In an embodiment, the user can use the right arrow key to select default 616 and assign a value to the form wizard. For example, if a series of new business accounts are to be handled with a currency type of British pounds, the user may first select British pounds as the currency type, then use default button 616 to designate British pounds as the default currency type. Each time the same type of form is opened in the future, British pounds will be already prefilled in the appropriate form field. As another example, in FIG. 7, selecting the default button 616 will set "Salesforce Corporation" as the default value to be displayed in the form wizard the next time a form field of the type Account Name 614 is encountered.

Done button 618 may be used once the electronic form field has been completed. After all fields are entered, the user can simply close the main dialog, or select the done button 618, to apply the last value entered and close the form wizard. Selecting a keyboard 'enter' key after the last displayed field also applies the changes and closes the dialog, eliminating mouse use totally.

Cancel button 620 may be used to cancel the use of the form wizard and allow the user to proceed with manual data entry. The clear all button 622 clears all fields with a single click and displays the first mandatory field in the form wizard main dialog, allowing the user to start over.

Figure 8:
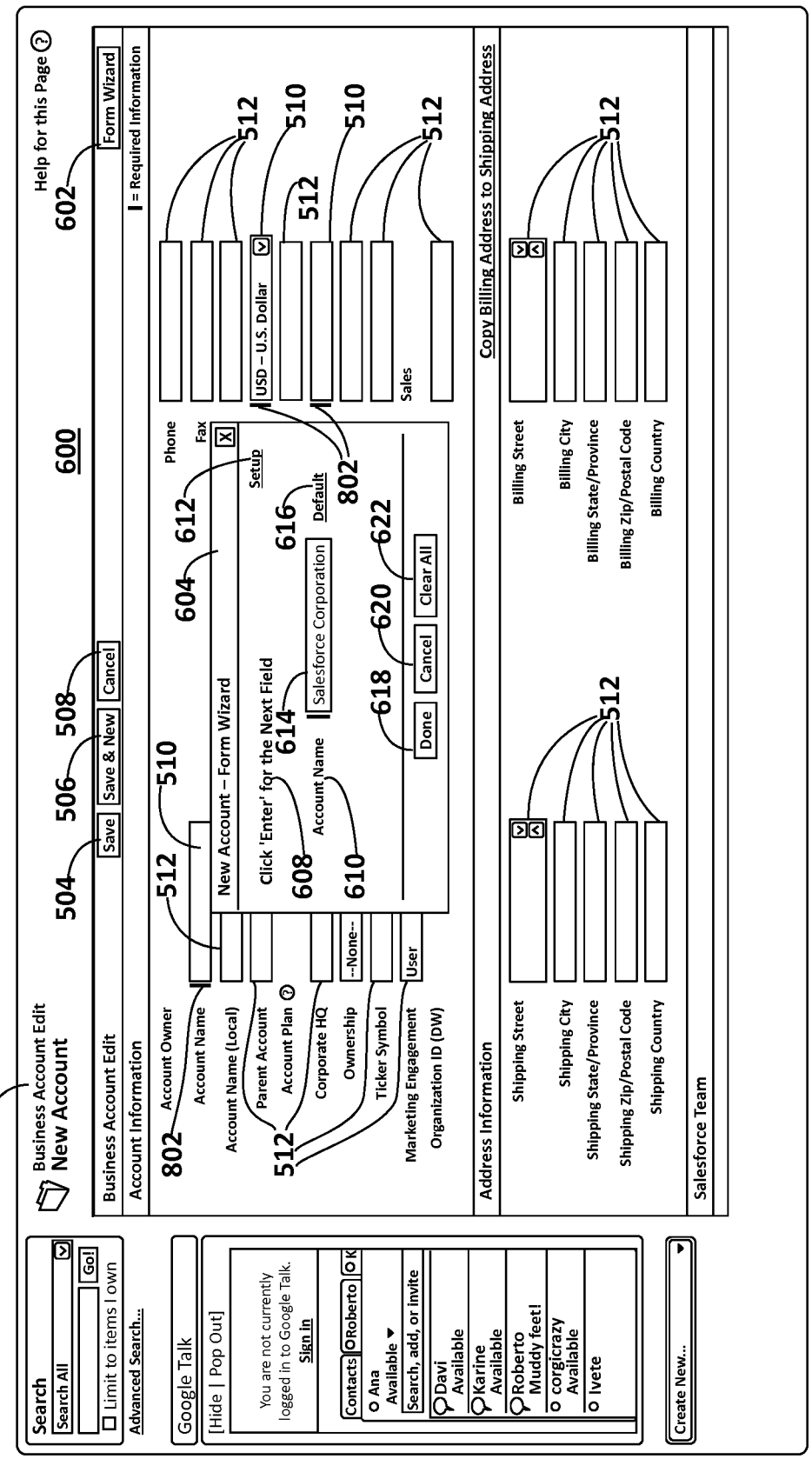
FIG. 8 is a screen capture showing an example of the correspondence between an empty form field and the form wizard dialog field.

FIG. 8 is a screen capture showing an example of the correspondence between an empty form field and the form wizard dialog field. The electronic form 600 and the form wizard dialog 604 of FIG. 8 may be similar or identical to the electronic form 600 and the form wizard dialog 604 of FIG. 7. In an embodiment, the fields of the form wizard dialog may be populated in order of their priority and setup. In an embodiment, mandatory form fields follow the application user interface design standards. For example, in FIG. 8, a dark vertical bar 802 is visible next to form fields indicating the field is mandatory. In an embodiment, mandatory form fields may be displayed one by one, followed by the optional fields that are assigned in the form wizard setup. In an embodiment, clicking on the 'Enter' key fills the appropriate field of the form with the entered value and replaces the form wizard field with the next assigned form field. For example, the next assigned form field may be the next mandatory form field, or it may be the next optional field selected by the user in setup.

Figure 9:
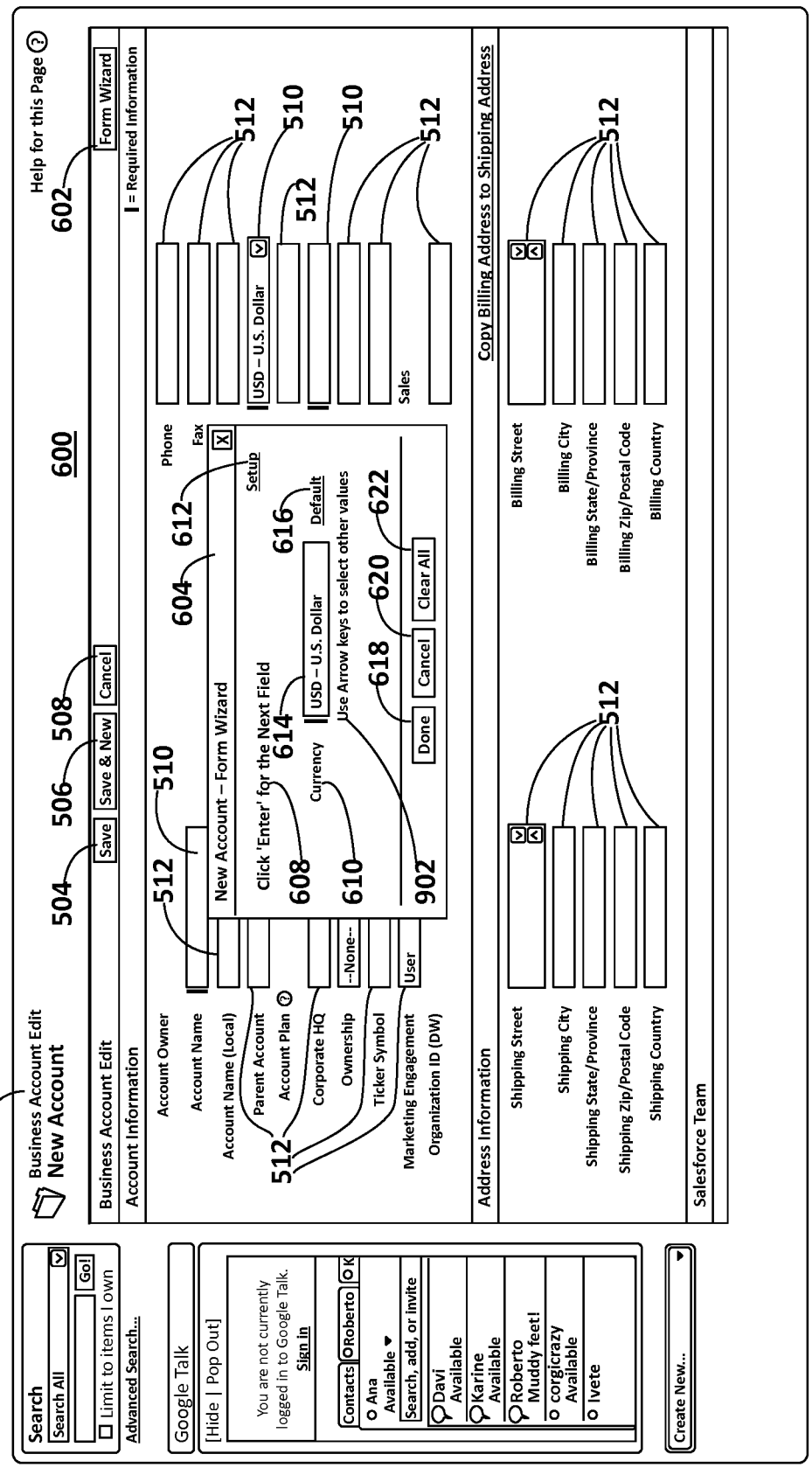
FIG. 9 is a screen capture showing an example of tutorials within the dialog box for shortcut key functions.

FIG. 9 is a screen capture showing an example of tutorials within the dialog box for shortcut key functions. The electronic form 600 and the form wizard dialog 604 of FIG. 9 may be similar or identical to the electronic form 600 and the form wizard dialog of FIG. 7. In an embodiment, the form wizard dialog 604 may additionally contain tutorials 624 of the shortcut key functions. The tutorials 624 may provide for a better user experience by instructing the user how to perform certain functions or tasks via the form wizard. For example, the tutorials may instruct the user to use arrow keys to select different values from a drop down menu field.

FIG. 10 is a screen capture showing an example of the correspondence between an empty drop down form field 1002 and a form wizard drop down field 1004. The electronic form 600 and the form wizard dialog 604 of FIG. 10 may be similar or identical to the electronic form 600 and the form wizard main dialog 604 of FIG. 7. When the form field is a drop down type, in an embodiment, clicking on the 'Enter' key fills the drop down field of the form with the selected value in the form wizard drop down field and replaces the form wizard field with the next assigned field. In an embodiment, a user can use the arrow keys to navigate the drop down field of the form wizard to designate the right value to be filled into the drop down form field of electronic form 600.

Figure 11:
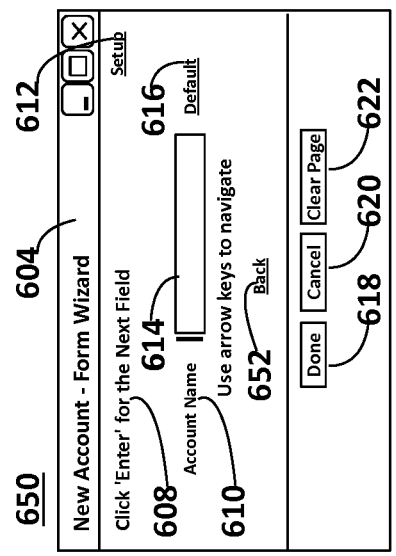
FIG. 11 is a screen capture showing an example of an alternative form wizard main dialog.

FIG. 11 is a screen capture showing an example of an alternative form wizard main dialog 650. The form wizard dialog of FIG. 10 differs from the form wizard dialog of FIG. 11 by including back button 652, which may be a button or hypertext link that allows the user to return to the previous form wizard field that was filled, in order to make changes.

Figure 12:
FIG. 12 is a screen capture showing an example of the form wizard setup button and the form wizard setup dialog.

FIG. 12 is a screen capture showing an example of the form wizard setup button and the form wizard setup dialog. Form wizard setup dialog 1200 may include form setup name 1201, checkboxes 1202, O.K. button 1204, cancel button 1206, and uncheck all button 1208. In other embodiments, form wizard setup dialog 1200 may not have all of the components listed and/or may have components instead of, or in addition to, those listed.

Form wizard setup dialog 1200 may be displayed when setup button 612 is selected. Form wizard setup dialog 1200 may include form setup name 1201. Form setup name 1201 may indicate what type of electronic form the form wizard is handling. In FIG. 12, the form setup name 1201 indicates the form wizard is handling a new account form.

Checkboxes 1202 allow a user to select which optional form fields of electronic form 600 are to be handled by the form wizard. In an embodiment, the checkboxes 1202 may have a checkbox for selecting the optional form fields. In another embodiment, the checkboxes 1202 may be of any form to allow the user to conveniently select the optional form fields. O.K. button 1204 may be used to save the selected optional form fields. Once O.K. button 1204 has been selected, the form wizard will handle those optional form fields that the user has indicated are desired. Cancel button 1206 closes the form wizard setup dialog 1200 and makes no changes to the form fields handled by the form wizard. Uncheck all button 1208 removes any and all selections made by the user to optional form field selectors 1202.

Since the form wizard may include all mandatory fields by default, the form wizard setup dialog may contain only the optional fields of the electronic form. By checking the checkboxes 1202 and clicking O.K. button 1204, the user adds the selected optional fields to the form wizard for handling. Cancel button 1206 closes the setup dialog without applying any changes. Uncheck all button 1208 clears all checkboxes 1202 with one click to allow a fresh start ergonomically.

FIG. 13 is a screen capture showing an example of the correspondence between an electronic form 600 and the various optional fields that may be enabled with the form wizard setup dialog. The electronic form 600 and form wizard setup dialog 1200 may be the same or similar to the electronic form 600 and form wizard setup dialog 1200 of FIG. 12. FIG. 13 illustrates the correspondence of optional form fields provided by the form wizard setup dialog 1200 to the optional form fields 512 of electronic form 600.

System Process Space

Figure 14:
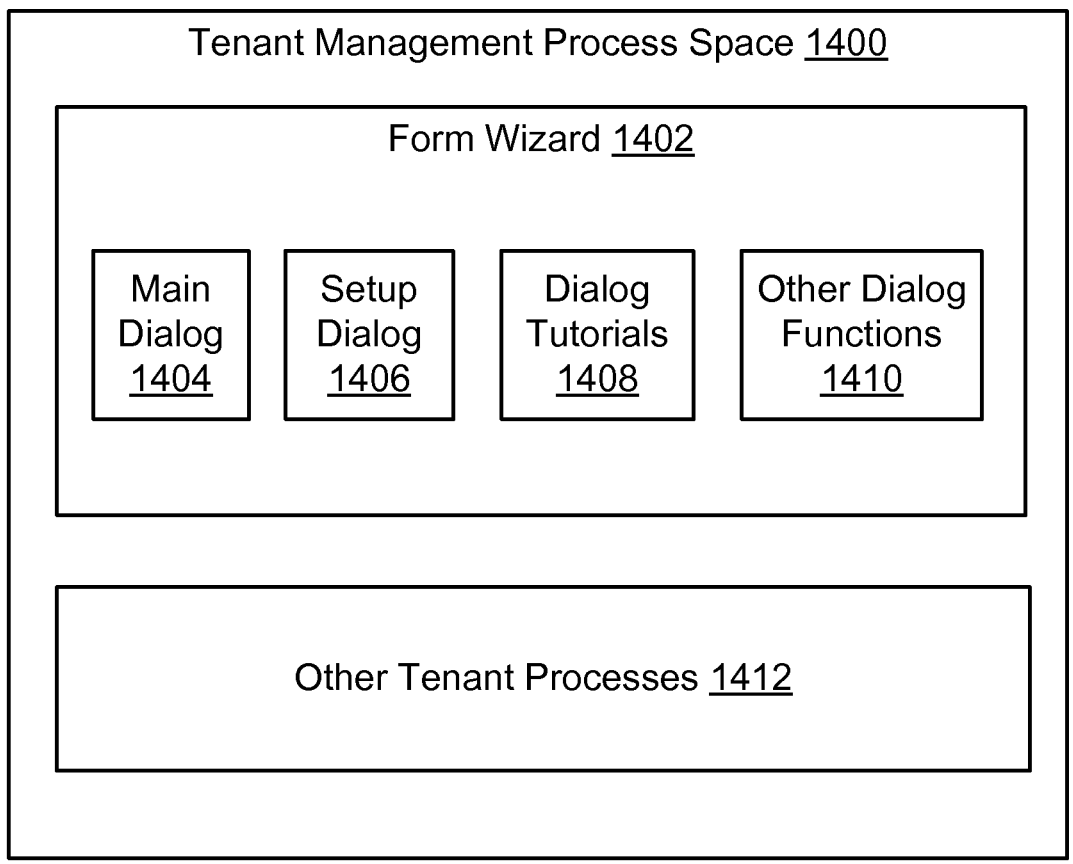
FIG. 14 is a block diagram of an embodiment of a tenant management process space.

FIG. 14 is a block diagram of an embodiment of a tenant management process space 1400, which may include form wizard 1402 having main dialog 1404, setup dialog 1406, dialog tutorials 1408, and other dialog functions 1410. Tenant management process space 1400 may also include other tenant processes 1412. In other embodiments, tenant management process space 1400 may not have all of the elements listed and/or may have other elements instead of, or in addition to, those listed.

Tenant management process space 1400 may be part of a multi-tenant database environment. The multi-tenant database environment may be comprised of various systems used to provide on-demand services to users of the multi-tenant database environment. As described previously, form wizard 1402 may be used to provide simplified form filling. The main dialog 1404 and setup dialog 1406 may be user interfaces for interacting with the multi-tenant database environment. Dialog tutorials 1408 may instruct users on how to use the form wizard dialog. Other dialog functions 1410 may contain form wizard dialog functionality such as cancel, save, save and new form, etc. Other tenant processes 1412 may contain processes such as requesting various electronic forms, saving electronic forms, recalling saved electronic forms, etc.

Next, a description of the multi-tenant environment in which simplified form filling may be provided as part of an on-demand service is described.

System Overview

Figure 15:
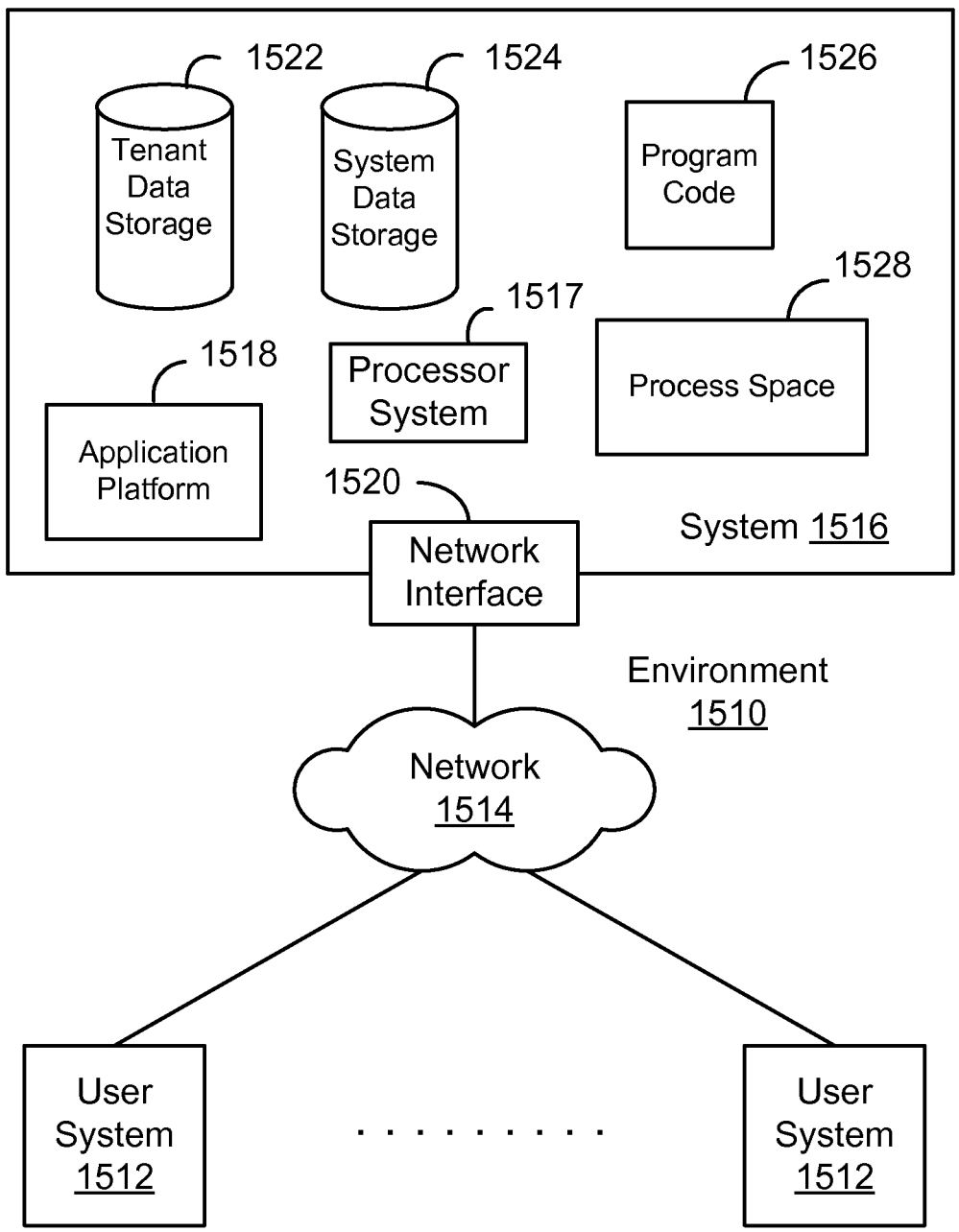
FIG. 15 illustrates a block diagram of an environment wherein an on-demand database service might be used.

FIG. 15 illustrates a block diagram of an environment 1510 wherein an on-demand database service might be used. Environment 1510 may include user systems 1512, network 1514, system 1516, processor system 1517, application platform 1518, network interface 1520, tenant data storage 1522, system data storage 1524, program code 1526, and process space 1528. In other embodiments, environment 1510 may not have all of the components listed and/or may have other elements instead of, or in addition to, those listed above.

Environment 1510 is an environment in which an on-demand database service exists. User system 1512 may be any machine or system that is used by a user to access a database user system. For example, any of user systems 1512 can be a handheld computing device, a mobile phone, a laptop computer, a workstation, and/or a network of computing devices. As illustrated in FIG. 15 (and in more detail in FIG. 16) user systems 1512 might interact via a network 1514 with an on-demand database service, which is system 1516.

An on-demand database service, such as system 1516, is a database system that is made available to outside users who do not necessarily need to be concerned with building and/or maintaining the database system, but instead may be available for their use when the users need the database system (i.e., on the demand of users). Some on-demand database services may store information from one or more tenants into tables of a common database image to form a multi-tenant database system (MTS). Accordingly, "on-demand database service 1516" and "system 1516" will be used interchangeably herein. A database image may include one or more database objects. A relational database management system (RDMS) or the equivalent may execute storage and retrieval of information against the database object(s). Application platform 1518 may be a framework that allows the applications of system 1516 to run, such as the hardware and/or software, e.g., the operating system. In an embodiment, on-demand database service 1516 may include an application platform 1518 that enables creating, managing, and executing one or more applications developed by the provider of the on-demand database service, by users accessing the on-demand database service via user systems 1512, or by third party application developers accessing the on-demand database service via user systems 1512.

The users of user systems 1512 may differ in their respective capacities, and the capacity of a particular user system 1512 might be entirely determined by permissions (permission levels) for the current user. For example, where a salesperson is using a particular user system 1512 to interact with system 1516, that user system has the capacities allotted to that salesperson. However, while an administrator is using that user system to interact with system 1516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1514 is any network or combination of networks of devices that communicate with one another. For example, network 1514 can be any one, or any combination, of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 1512 might communicate with system 1516 using TCP/IP and, at a higher network level, use other common Internet protocols to communicate, such as HTTP, FTP, AFS, WAP, etc. In an example where HTTP is used, user system 1512 might include an HTTP client commonly referred to as a "browser" for sending and receiving HTTP messages to and from an HTTP server at system 1516. Such an HTTP server might be implemented as the sole network interface between system 1516 and network 1514, but other techniques might be used as well or instead. In some implementations, the interface between system 1516 and network 1514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1516, shown in FIG. 15, implements a web-based customer relationship management (CRM) system. For example, in one embodiment, system 1516 includes application servers configured to implement and execute CRM software applications as well as to provide related data, code, forms, webpages and other information to and from user systems 1512 and to store to, and retrieve from, a database system related data, objects, and webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1516 implements applications other than, or in addition to, a CRM application. For example, system 1516 may provide tenant access to multiple hosted (standard and custom) applications, including a CRM application. User (or third party developer) applications, which may or may not include CRM, may be supported by the application platform 1518, which manages creation, storage of the applications into one or more database objects and executing of the applications in a virtual machine in the process space of the system 1516.

One arrangement for elements of system 1516 is shown in FIG. 15, including a network interface 1520, application platform 1518, tenant data storage 1522 for tenant data 1623, system data storage 1524 for system data 1625 accessible to system 1516 and possibly multiple tenants, program code 1526 for implementing various functions of system 1516, and a process space 1528 for executing MTS system processes and tenant-specific processes, such as running applications as part of an application hosting service. Additional processes that may execute on system 1516 include database indexing processes.

Several elements in the system shown in FIG. 15 include conventional, well-known elements that are explained only briefly here. For example, each user system 1512 could include a desktop personal computer, workstation, laptop, PDA, cell phone, or any wireless access protocol (WAP) enabled device or any other computing device capable of interfacing directly or indirectly to the Internet or other network connection. User system 1512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 1512 to access, process and view information, pages and applications available to it from system 1516 over network 1514. Each user system 1512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1516 or other systems or servers. For example, the user interface device can be used to access data and applications hosted by system 1516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1512 and all of its components are operator configurable using applications, such as a browser, including computer code run using a central processing unit such as an Intel Pentium® processor or the like. Similarly, system 1516 (and additional instances of an MTS, where more than one is present) and all of their components might be operator configurable using application(s) including computer code to run using a central processing unit such as processor system 1517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 1516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1516 is configured to provide webpages, forms, applications, data and media content to user (client) systems 1512 to support the access by user systems 1512 as tenants of system 1516. As such, system 1516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 16:
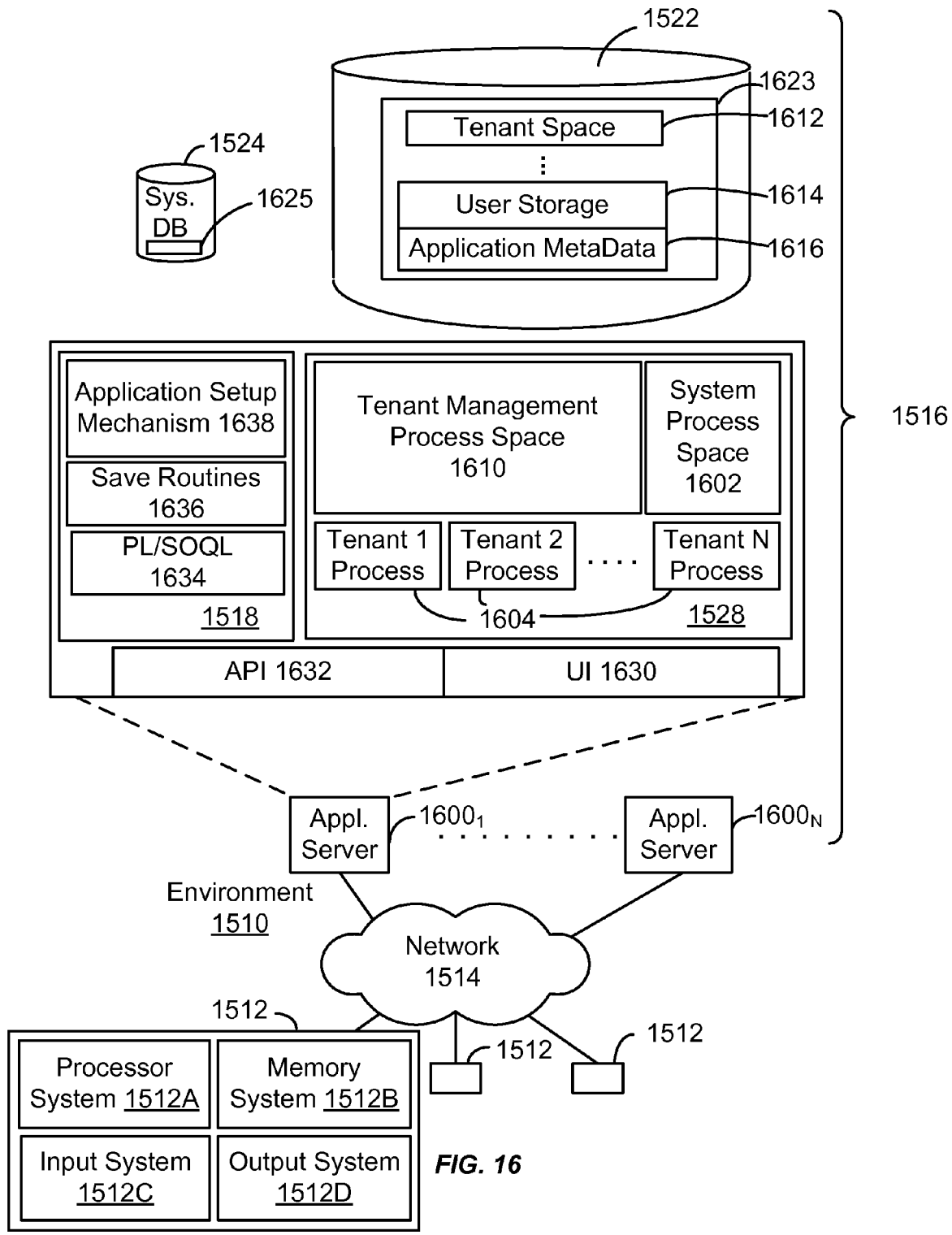
FIG. 16 illustrates elements of FIG. 15 and various possible interconnections between these elements in an embodiment.

FIG. 16 also illustrates environment 1510. However, in FIG. 16 elements of system 1516 and various interconnections in an embodiment are further illustrated. FIG. 16 shows that user system 1512 may include processor system 1512A, memory system 1512B, input system 1512C, and output system 1512D. FIG. 16 shows network 1514 and system 1516. FIG. 16 also shows that system 1516 may include tenant data storage 1522 having tenant data 1623, system data storage 1524 having system data 1625, User Interface (UI) 1630, Application Program Interface (API) 1632, PL/SOQL 1634, save routines 1636, application setup mechanism 1638, applications servers $1600_1$-$1600_N$, system process space 1602, tenant process spaces 1604, tenant management process space 1610, tenant space 1612, user storage 1614, and application metadata 1616. In other embodiments, environment 1510 may not have the same elements as those listed above and/or may have other elements instead of, or in addition to, those listed above.

User system 1512, network 1514, system 1516, tenant data storage 1522, and system data storage 1524 were discussed above in FIG. 15. Regarding user system 1512, processor system 1512A may be any combination of one or more processors. Memory system 1512B may be any combination of one or more memory devices, short term, and/or long term memory. Input system 1512C may be any combination of input devices, such as one or more keyboards, mice, trackballs, scanners, cameras, and/or interfaces to networks. Output system 1512D may be any combination of output devices, such as one or more monitors, printers, and/or interfaces to networks. As shown by FIG. 16, system 1516 may include a network interface 1520 (of FIG. 15) implemented as a set of HTTP application servers 1600, an application platform 1518, tenant data storage 1522, and system data storage 1524. Also shown is system process space 1602, including individual tenant process spaces 1604 and a tenant management process space 1610. Each application server 1600 may be configured to tenant data storage 1522 and the tenant data 1623 therein, and system data storage 1524 and the system data 1625 therein to serve requests of user systems 1512. The tenant data 1623 might be divided into individual tenant spaces 1612, which can be either a physical arrangement and/or a logical arrangement of data. Within each tenant space 1612, user storage 1614 and application metadata 1616 might be similarly allocated for each user. For example, a copy of a user's most recently used (MRU) items might be stored to user storage 1614. Similarly, a copy of MRU items for an entire organization that is a tenant might be stored to tenant space 1612. A UI 1630 provides a user interface and an API 1632 provides an application programmer interface to system 1516 resident processes to users and/or developers at user systems 1512. The tenant data and the system data may be stored in various databases, such as one or more Oracle™ databases.

Application platform 1518 includes an application setup mechanism 1638 that supports application developers' creation and management of applications, which may be saved as metadata into tenant data storage 1522 by save routines 1636 for execution by subscribers as one or more tenant process spaces 1604 managed by tenant management process 1610 for example. Invocations to such applications may be coded using PL/SOQL 1634 that provides a programming language style interface extension to API 1632. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 1616 for the subscriber making the invocation and executing the metadata as an application in a virtual machine.

Each application server 1600 may be communicably coupled to database systems, e.g., having access to system data 1625 and tenant data 1623, via a different network connection. For example, one application server $1600_1$ might be coupled via the network 1514 (e.g., the Internet), another application server $1600_{N-1}$ might be coupled via a direct network link, and another application server $1600_N$ might be coupled by yet a different network connection. Transfer Control Protocol and Internet Protocol (TCP/IP) are typical protocols for communicating between application servers 1600 and the database system. However, it will be apparent to one skilled in the art that other transport protocols may be used to optimize the system depending on the network interconnect used.

In certain embodiments, each application server 1600 is configured to handle requests for any user associated with any organization that is a tenant. Because it is desirable to be able to add and remove application servers from the server pool at any time for any reason, there is preferably no server affinity for a user and/or organization to a specific application server 1600. In one embodiment, therefore, an interface system implementing a load balancing function (e.g., an F5 Big-IP load balancer) is communicably coupled between the application servers 1600 and the user systems 1512 to distribute requests to the application servers 1600. In one embodiment, the load balancer uses a least connections algorithm to route user requests to the application servers 1600. Other examples of load balancing algorithms, such as round robin and observed response time, also can be used. For example, in certain embodiments, three consecutive requests from the same user could hit three different application servers 1600, and three requests from different users could hit the same application server 1600. In this manner, system 1516 is multi-tenant, wherein system 1516 handles storage of, and access to, different objects, data and applications across disparate users and organizations.

As an example of storage, one tenant might be a company that employs a sales force where each salesperson uses system 1516 to manage their sales process. Thus, a user might maintain contact data, leads data, customer follow-up data, performance data, goals and progress data, etc., all applicable to that user's personal sales process (e.g., in tenant data storage 1522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1516 might also maintain system level data usable by multiple tenants or other data. Such system level data might include industry reports, news, postings, and the like that are sharable among tenants.

In certain embodiments, user systems 1512 (which may be client systems) communicate with application servers 1600 to request and update system-level and tenant-level data from system 1516 that may require sending one or more queries to tenant data storage 1522 and/or system data storage 1524. System 1516 (e.g., an application server 1600 in system 1516) automatically generates one or more SQL statements (e.g., one or more SQL queries) that are designed to access the desired information. System data storage 1524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System," and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. Rather, it is intended to cover various modifications and similar arrangements as would be apparent to those skilled in the art. Therefore, the scope of the appended claims should be accorded the broadest interpretation so as to encompass all such modifications and similar arrangements.

Method for Using the Environment (FIGS. 15 and 16)

Figure 17:
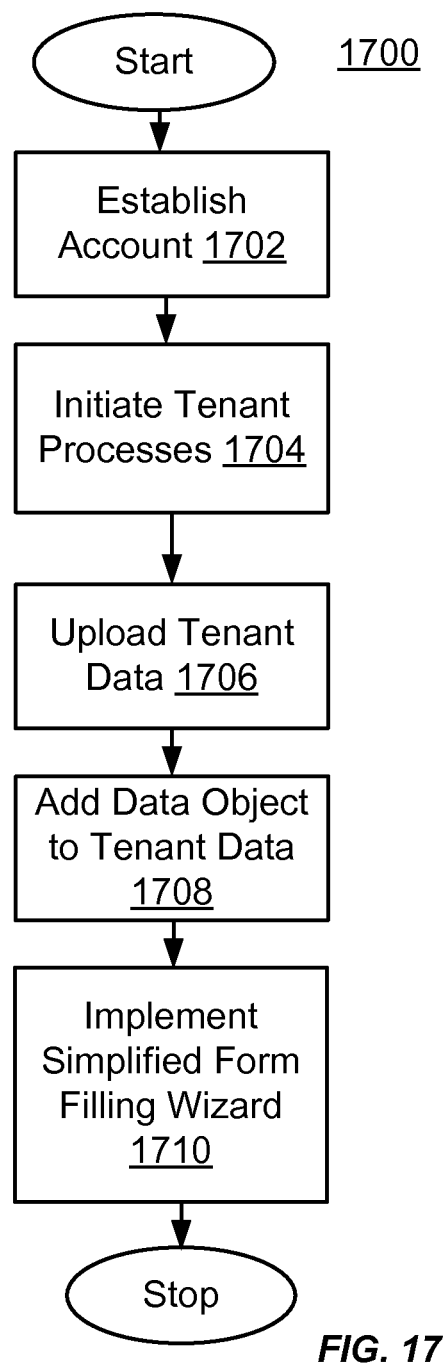
FIG. 17 is a flowchart of an example of a method of using the environment of FIGS. 15 and 16.

FIG. 17 is a flowchart of an example of a method 1700 of using environment 1510. In step 1702, user system 1512 (FIGS. 15 and 16) establishes an account. In step 1704, one or more tenant processes 1604 (FIG. 16) are initiated on behalf of user system 1512, which may also involve setting aside space in tenant space 1612 (FIG. 16) and user storage 1614 (FIG. 16) for user system 1512. Step 1704 may also involve modifying application metadata to accommodate user system 1512. In step 1706, user system 1512 uploads data. In step 1708, one or more data objects are added to user storage 1614 where the data uploaded is stored. In step 1710, methods for providing simplified form filling in an on-demand service may be implemented. In another embodiment, although depicted as distinct steps in FIG. 17, steps 1702-1710 may not be distinct steps. In other embodiments, method 1700 may not have all of the above steps and/or may have other steps in addition to, or instead of, those listed above. The steps of method 1700 may be performed in another order. Subsets of the steps listed above as part of method 1700 may be used to form their own method.

Method for Creating the Environment (FIGS. 15 and 16)

Figure 18:
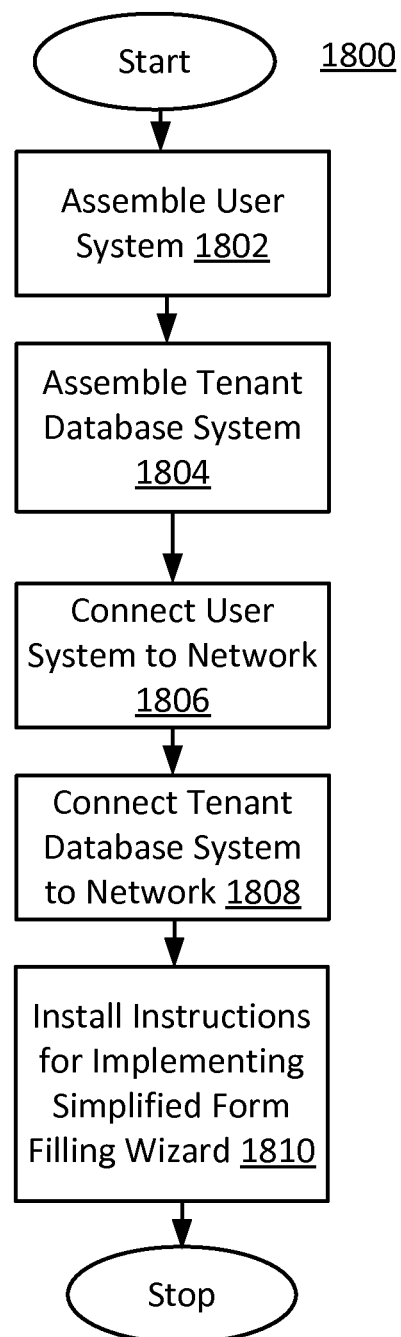
FIG. 18 is a flowchart of an example of a method of making the environment of FIGS. 15 and 16.

FIG. 18 is a method of making environment 1510. In step 1802, user system 1512 (FIGS. 15 and 16) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1804, system 1516 (FIGS. 15 and 16) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 1516 may include installing application platform 1518, network interface 1520, tenant data storage 1522, system data storage 1524, system data 1625, program code 1526, process space 1528, UI 1630, API 1632, PL/SOQL 1634, save routine 1636, application setup mechanism 1638, applications servers 1600$_1$-1600$_N$, system process space 1602, tenant processes 1604, tenant management process space 1610, tenant space 1612, user storage 1614, and application metadata 1616 (FIG. 16).

In step 1806, user system 1512 is communicatively coupled to network 1514. In step 1808, system 1516 is communicatively coupled to network 1514 allowing user system 1512 and system 1516 to communicate with one another (FIG. 16). In step 1810, one or more instructions may be installed in system 1516 (e.g., the instructions may be installed on one or more machine readable media, such as computer readable media, therein) and/or system 1516 is otherwise configured for performing the steps of methods for providing simplified form filling in an on-demand service. For example, as part of step 1810, one or more instructions may be entered into the memory of system 1516 for providing simplified form filling in an on-demand service.

In another embodiment, although depicted as distinct steps in FIG. 18, steps 1802-1810 may not be distinct steps. In other embodiments, method 1800 may not have all of the above steps and/or may have other steps in addition to, or instead of, those listed above. The steps of method 1800 may be performed in another order. Subsets of the steps listed above as part of method 1800 may be used to form their own method.

Extensions and Alternatives

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for providing simplified form filling in an on-demand service in a machine resident database system for a multi-tenant database system, the method comprising:
    receiving, at the machine resident database system, a request from a user machine to set up a form wizard for a first form comprising form fields displayed at the user machine;
    sending, by the machine resident database system, a form wizard setup interface to set up the form wizard, the form wizard setup interface including an interfae screen that will be displayed in addition to the first form, and the interface screen further comprising the form fields of the first form that are each available for user-defined selection;
    receiving, at the machine resident database system, information obtained from the sent form wizard setup interface, the information received including user defined selections from the interface screen for setting up a form wizard user interface;
    setting up the form wizard user interface based on the information received, the form wizard user interface providing indications of how to fill out the first form as the first form is being filled out;
    receiving at the machine resident database system, a request from the user machine to fill a plurality of the form fields using the form wizard;
    sending, by the machine resident database system, the form wizard user interface configured to prompt the user to sequentially fill in the plurality of the form fields by searching the first form for the form fields and presenting the searched fields to the user in priority order based on the user defined selections and in a step-by step fashion;
    receiving, at the machine resident database system, specifying information to fill each of the respective form fields of the first form from the form wizard;
    sending to the user machine an updated instance of the first form having the respective form fields filled in with the specifying information; and
    in response to the first form being completed by the user for one account, sending to the user a second electronic form for another account associated with the user, for the user to fill out, and receiving at the machine resident database system, specifying information for the second electronic form for the other account filled out, via the form wizard.

2. The method of claim 1, wherein the form wizard user interface enables navigation of the form fields without benefit of a pointing device.

3. The method of claim 1, wherein at least one of the form fields is a mandatory form field.

4. The method of claim 1, wherein at least one of the form fields is an optional form field.

5. The method of claim 1, wherein the form wizard user interface automatically determines mandatory form fields.

6. The method of claim 1, wherein the form wizard user interface automatically adopts an application user interface design standard of the mandatory form fields.

7. The method of claim 1, wherein the information received contain optional form fields for setting up the form wizard user interface.

8. The method of claim 1, wherein the form wizard contains instructions for instructing a user to use the form wizard.

9. The method of claim 1, wherein the form wizard user interface allows a user to designate default values for the form fields, the default values allowing the user to quickly fill form fields of a same type.

10. The method of claim 1, wherein the form wizard setup interface is accessible only to users having appropriate privileges.

11. The method of claim 1, wherein:
    the form wizard contains instructions for instructing a user to use the form wizard, the form wizard setup interface accessible only to users having appropriate privileges; and
    the information received contains optional form fields for setting up the form wizard user interface.

12. The method of claim 1, wherein:
    the form wizard contains instructions for instructing a user to use the form wizard, the form wizard setup interface accessible only to users having appropriate privileges;
    the information received contains optional form fields for setting up the form wizard user interface, the form wizard user interface allowing a user to designate default values for the form fields, the default values allowing the user to quickly fill the form fields of a same type; and
    the method further comprises enabling navigation of the form fields without benefit of a pointing device.

13. The method of claim, 1 the form wizard user interface including a graphical image with an input field, the form wizard user interface appearing on top the image of the form, the form wizard user interface covering a portion of the form, while leaving a portion of the form having the particular field uncovered.

14. The method of claim 13, the form wizard user interface being a dialogue box.

15. The method of claim 1, the image of the form including a link for activating the form wizard.

16. The method of claim 1, the form wizard directing a user to fill in the mandatory fields prior to filling in fields that are not mandatory.

17. The method of claim 1, the form wizard user interface including a field for entering data required by a particular form field of the form, the method further comprising:
    sending, by the machine resident database system, an indication of which form field of the form is the particular form field;
    sending, by the machine resident database system, an image of the first form, the image of the first form and the form wizard user interface being separate graphical objects, the image of the first form and the form wizard user interface being visually distinct from one another, and the image of the first form, the indication of the particular form field, and the form wizard user interface are visible by the user of the form wizard simultaneously.

18. The method of claim 17, the sending to the user machine an updated instance of the first form reflecting the filing of each respective form field further including at least:
sending, by the machine resident database system, another image of the form and the form wizard user interface, but with the indication of the particular field indicating a different field.

19. The method of claim 1, as the first form is being filled out, the form wizard navigates the user through the form without the user needing to use the scroll bar.

20. A method for providing simplified form filling in an on-demand service in a machine resident database system for a multi-tenant database system, the method comprising:
receiving, at the machine resident database system, a request from a user machine to set up a form wizard for a first form comprising at least one or more form fields displayed at the user machine;
sending, by the machine resident database system, a form wizard setup interface to set up the form wizard, the form wizard setup interface including an interface screen that will be displayed in addition to the first form, and the interface screen further comprising the at least one or more form fields of the first form that are each available for user-defined selection;
receiving, at the machine resident database system, information obtained from the sent form wizard setup interface, the information received including user defined selections from the interface screen for setting up a form wizard user interface;
setting up the form wizard user interface based on the information received, the form wizard user interface providing indications of how to fill out the first form as the form is being filled out;
receiving at the machine resident database system, a request from the user machine to fill at least one of the form fields using a form wizard;
sending, by the machine resident database system, the form wizard user interface configured to prompt the user to sequentially fill in the plurality of the form fields by searching the form for the form fields and presenting the searched field to the user in priority order based on the user defined selections and in a step-by-step fashion;
receiving, at the machine resident database system, specifying information to fill the at least one of the form fields from the form wizard; and
sending to the user machine an updated instance of the first form having the at least one of the form fields filled in with the specifying information;
in response to the first form being completed by the user for one account, sending to the user a second form for another account associated with the user, for the user to fill out, and receiving at the machine resident database system, specifying information for the second form for the other account filled out, via the form wizard;
wherein the form wizard user interface is capable of filling form fields without benefit of a pointing device and includes a save-and-new link, which when activated automatically saves the current form and opens a new form.

21. A non-transitory machine-readable medium storing thereon one or more instructions, which when implemented cause a processor to implement a method for providing simplified form filling in an on-demand service, the method comprising:
receiving, at a machine resident database system, a request from a user machine to set up a form wizard for a form comprising form fields displayed at the user machine;
sending, by the machine resident database system, a form wizard setup interface to set up the form wizard, the form wizard setup interface including an interface screen that will be displayed in addition to the first form, and the interface screen further comprising the form fields of the form that are each available for user-defined selection;
receiving, at the machine resident database system, information obtained from the sent form wizard setup interface, the information received including user defined selections from the interface screen for setting up the form wizard user interface;
setting up the form wizard user interface based on the information received, the form wizard user interface providing indications of how to fill out the form as the form is being filled out;
receiving at the machine resident database system, a request from the user machine to fill a plurality of the form fields using the form wizard;
sending, by the machine resident database system, the form wizard user interface configured to prompt the user to sequentially fill in the plurality of the form fields by searching the form for the form fields and presenting the searched field to the user in priority order based on the user defined selections and in a step-by-step fashion;
receiving, at the machine resident database system, specifying information to fill each of the respective form fields of the form from the form wizard; and
sending to the user machine an updated instance of the form having the respective form fields filled in with the specifying information.

22. The machine-readable medium of claim 21, wherein:
the form wizard contains instructions for instructing a user to use the form wizard, the form wizard setup interface accessible only to users having appropriate privileges; and
the information received contains optional form fields for setting up the form wizard user interface.

23. The machine-readable medium of claim 21, wherein:
the form wizard contains instructions for instructing a user to use the form wizard, the form wizard setup interface accessible only to users having appropriate privileges;
the information received contains optional form fields for setting up the form wizard user interface, the form wizard user interface allowing a user to designate default values for form fields, the default values allowing the user to quickly fill form fields of a same type; and
the method further comprises enabling navigation of the form fields without benefit of a pointing device.

24. A machine resident host system for simplifying form filling in an on-demand service in a multi-tenant database system, the host system comprising:
a processor system; and
a memory system including at least volatile memory, and non-volatile memory;
the non-volatile memory including at least one machine readable medium carrying one or more sequences of instructions which when implemented causes the processor system to implement a method including at least:

receiving, at a machine resident database system, a request from a user machine to set up a form wizard for a form comprising form fields displayed at the user machine;

sending, by the machine resident database system, a form wizard setup interface to set up the form wizard, the form wizard setup interface including an interface screen that will be displayed in addition to the form, and the interface screen further comprising fields of the form that are each available for user-defined selection;

receiving, at the machine resident database system, information obtained from the sent form wizard setup interface, the information received including user defined selections from the interface screen for setting up the form wizard user interface;

setting up the form wizard user interface based on the information received;

receiving, at the machine resident database system, a request from the user machine to fill a plurality of the form fields using the form wizard;

sending, by the machine resident database system, the form wizard user interface configured to prompt the user to sequentially fill in the plurality of the form fields by searching the form for the form fields and presenting the searched field to the user in priority order based on the user defined selections and in a step-by-step fashion;

receiving, at the machine resident database system, specifying information to fill each of the respective form fields of the form from the form wizard; and sending to the user machine an updated instance of the form having the respective form fields filled in with the specifying information;

the form wizard user interface including a graphical image with an input field, the form wizard user interface appearing on top the image of the form, the form wizard user interface covering a portion of the form, while leaving a portion of the form having the particular field uncovered.

25. The machine resident host system of claim 24, wherein:

the form wizard contains instructions for instructing a user to use the form wizard, the form wizard setup interface accessible only to users having appropriate privileges; and the information received contains optional form fields for setting up the form wizard user interface.

26. The machine resident host system of claim 24, wherein:

the form wizard contains instructions for instructing a user to use the form wizard, the form wizard setup interface accessible only to users having appropriate privileges;

the information received contains optional form fields for setting up the form wizard user interface, the form wizard user interface allowing a user to designate default values for form fields, the default values allowing the user to quickly fill form fields of a same type; and the method further comprises enabling navigation of the form fields without benefit of a pointing device.

\* \* \* \* \*